United States Patent
Choe et al.

(10) Patent No.: US 11,618,840 B2
(45) Date of Patent: Apr. 4, 2023

(54) ADDITIVE FOR EPOXY ADHESIVE AND EPOXY ADHESIVE COMPOSITION FOR CONSTRUCTION INCLUDING SAME

(71) Applicants: PUSAN NATIONAL UNIVERSITY INDUSTRY-UNIVERSITY COOPERRATION FOUNDATION, Busan (KR); KOREA UNIVERSITY RESEARCH AND BUSINESS FOUNDATION, Seoul (KR)

(72) Inventors: Young Sun Choe, Busan (KR); Joona Bang, Busan (KR); Jun Soo Moon, Busan (KR)

(73) Assignees: PUSAN NATIONAL UNIERSITY INDUSTRY-UNIVERSITY COOPERRATION FOUNDATION, Busan (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 809 days.

(21) Appl. No.: 16/499,571

(22) PCT Filed: May 9, 2018

(86) PCT No.: PCT/KR2018/005297
§ 371 (c)(1),
(2) Date: Sep. 30, 2019

(87) PCT Pub. No.: WO2018/208073
PCT Pub. Date: Nov. 15, 2018

(65) Prior Publication Data
US 2020/0248049 A1 Aug. 6, 2020

(30) Foreign Application Priority Data

May 12, 2017 (KR) .................. 10-2017-0059010

(51) Int. Cl.
*C09J 163/00* (2006.01)
*C08F 220/18* (2006.01)
*C08F 236/20* (2006.01)
*C08G 64/04* (2006.01)
*C08L 19/00* (2006.01)
*C08L 63/00* (2006.01)
(Continued)

(52) U.S. Cl.
CPC .......... *C09J 163/00* (2013.01); *C08F 220/18* (2013.01); *C08F 236/20* (2013.01); *C08G 64/04* (2013.01);
(Continued)

(58) Field of Classification Search
None
See application file for complete search history.

(56) References Cited

U.S. PATENT DOCUMENTS 7,825,199 B1 * 11/2010 Matyjaszewski ... C08F 293/005
526/111

FOREIGN PATENT DOCUMENTS

| JP | H08-295865 | 11/1996 |
| JP | 2005-255822 | 9/2005 |

(Continued)

OTHER PUBLICATIONS

Machine-generated translation of Detailed Description of JP 2013241479A, retrieved from ESPACENET on Aug. 8, 2022. (Year: 2013).*

(Continued)

*Primary Examiner* — Fred M Teskin
(74) *Attorney, Agent, or Firm* — Norton Rose Fulbright US LLP

(57) ABSTRACT

In an additive for an epoxy adhesive and an epoxy adhesive composition for construction including same, the additive for an epoxy adhesive is formed by atomic transfer radical polymerization (ATRP) of a polyacrylate of which one terminal is halogenated, as an arm-polymer, and a diacry- (Continued)

late-based compound or a dimethacrylate-based compound, as a cross-linker, and comprises a star polymer of a star-shape having a core/shell structure including a core formed by the polymerization of the cross-linker and a shell formed by a portion of the arm-polymer.

8 Claims, 6 Drawing Sheets

(51) Int. Cl.
    *C08L 75/04*     (2006.01)
    *C09J 11/08*     (2006.01)

(52) U.S. Cl.
CPC ............... *C08L 19/00* (2013.01); *C08L 63/00* (2013.01); *C08L 75/04* (2013.01); *C09J 11/08* (2013.01); *C08F 2438/01* (2013.01); *C08F 2810/40* (2013.01); *C08L 2207/53* (2013.01); *C08L 2312/02* (2013.01); *C09J 2203/00* (2013.01); *C09J 2433/00* (2013.01)

(56) References Cited

FOREIGN PATENT DOCUMENTS

| JP | 2010-059388 | | 3/2010 | | |
|---|---|---|---|---|---|
| JP | 2013241479 | A * | 12/2013 | ............. | C08G 59/40 |
| KR | 2011-0005257 | | 1/2011 | | |

OTHER PUBLICATIONS

Gao, et al, "Low Polydispersity Star Polymers via Cross-Linking Macromonomers by ATRP," J. Am. Chem. Soc. 2006, 128, 15111-15113. (Year: 2006).*

Hatada, et al, "Preparation of Star-Shaped Polymer with Stereoregular Poly(methyl methacrylate) Arms," J. Macromol. Sci.—Pure Appl. Chem., A39(8), 801-814 (2002). (Year: 2002).*

Blencowe et al., "Core cross-linked star polymers via controlled radical polymerisation" *Polymer,* 2009, 50:5-32.

International Search Report and Written Opinion issued in Corresponding International Patent Application No. PCT/KR2018/005297, dated Aug. 10, 2018.

* cited by examiner

ADDITIVE FOR EPOXY ADHESIVE AND EPOXY ADHESIVE COMPOSITION FOR CONSTRUCTION INCLUDING SAME

This application is a national phase under 35 U.S.C. § 371 of International Application No. PCT/KR2018/005297, filed May 9, 2018, which claims the benefit of Korean Patent Application No. 10-2017-0059010, filed May 12, 2017. The contents of the referenced patent applications are incorporated into the present application by reference.

TECHNICAL FIELD

The present disclosure relates to an additive for an epoxy adhesive and a structural epoxy adhesive composition containing the additive. More specifically, the present disclosure relates to an additive for an epoxy adhesive used in a structural epoxy adhesive composition having improved adhesion ability and impact-resistance and to a structural epoxy adhesive composition containing the same.

BACKGROUND ART

A structural adhesive may be defined as a material that has property to bond high strength materials such as wood, composites or metals such that an adhesive strength of the adhesive exceeds 6.9 MPa (1,000 psi) at room temperature. Such structural adhesive are particularly used in fields requiring high performance in automotive and aerospace industries, and must have high mechanical strength and impact-resistance.

An epoxy resin has many excellent properties compared to other resins such as adhesion ability, heat resistance, chemical resistance, electrical properties, mechanical properties for various substrates, and is used in a wide range of industries. The epoxy resin is an intermediate (prepolymer) of a thermosetting resin, and reacts with a curing agent to form a three-dimensional network structure as a cured product of the epoxy resin showing an inherent properties of an epoxy.

However, in some cases, the cured product of the epoxy resin has low fracture toughness, and very brittle properties. In a way to solve this problem, nanoparticles as additive are mixed with the epoxy resin. That is, there is an advantage in that a tensile strength and a lap shear strength of the cured product of the epoxy resin may be improved by curing the mixture of the nanoparticles an additive and the epoxy resin. Further, introducing block copolymer-based additive in addition to introducing rubber or inorganic particles into the epoxy resin to improve the mechanical properties such as the adhesive strength and impact-resistance of the epoxy resin are being studied.

DISCLOSURE

Technical Purposes

One purpose of the present disclosure is to provide an additive for an epoxy adhesive that may allow the epoxy adhesive to have improved impact-resistance and high adhesive strength.

Another purpose of the present disclosure is to provide a structural epoxy adhesive composition containing the additive that may be used in the automotive or aviation industry.

Technical Solutions

A first aspect of the present disclosure provides an additive for an epoxy adhesive, the additive comprising a star-shaped star polymer having a core/shell structure, wherein the star polymer is formed via atomic transfer radical polymerization (ATRP) between an arm-polymer and a cross-linker, wherein the arm-polymer includes a polyacrylate having one halogenated terminal, and the cross-linker includes a diacrylate-based compound or a dimethacrylate-based compound, wherein the core includes a polymer resulting from polymerization of the cross-linker, and a portion of the arm-polymer constitutes the shell.

In one implementation of the additive for the epoxy adhesive, the cross-linker includes divinylbenzene or 1,4-butanediol dimethacrylate.

In one implementation of the additive for the epoxy adhesive, the cross-linker includes divinylbenzene, wherein a molar ratio between the divinylbenzene used for formation of the core and the arm-polymer is in a range of 6:1 to 10:1.

In one implementation of the additive for the epoxy adhesive, the cross-linker includes 1,4-butanediol dimethacrylate, wherein a molar ratio of 1,4-butanediol dimethacrylate used for formation of the core and the arm-polymer is in a range of 12:1 to 18:1.

In one implementation of the additive for the epoxy adhesive, the core has a diameter of 5 nm to 100 nm A second aspect of the present disclosure provides an additive for an epoxy adhesive, the additive comprising: a core including a polymer of a diacrylate-based compound or a dimethacrylate-based compound; and a shell connected to the core, wherein the shell is formed of a linear polymer of polyacrylate, wherein the linear polymer extends from a surface of the core radially and outwardly.

A third aspect of the present disclosure provides a structural epoxy adhesive composition comprising: an epoxy resin; the additive for the epoxy adhesive as defined above; and an epoxy curing agent.

In one implementation of the structural epoxy adhesive composition, a content of the additive for the epoxy adhesive is in a range of 5 to 60 parts by weight based on 100 parts by weight of the epoxy resin.

In one implementation of the structural epoxy adhesive composition, the structural epoxy adhesive composition further contains rubber particles, modified urethane resin and modified epoxy resin. In one implementation of the structural epoxy adhesive composition, the epoxy resin includes a bisphenol-A derived epoxy resin, a chelate-substituted functional epoxy resin, and a reactive diluent.

In one implementation of the structural epoxy adhesive composition, the additive for the epoxy adhesive is dispersed in the epoxy resin as a medium while forming a micelle or vesicle.

In one implementation of the structural epoxy adhesive composition, the structural epoxy adhesive composition is cured at 100° C. to 180° C. to form a cured product thereof, wherein the additive for the epoxy adhesive is dispersed in a form of a micelle or vesicle in the cured product.

Technical Effects

According to the additive for the epoxy adhesive and the structural epoxy adhesive composition containing the same in accordance with the present disclosure as described above, the additive for the epoxy adhesive includes the star polymer having the core/shell structure, where the shell may be in a form of a flexible brush, and thus the flexibility of the shell may be easily controlled based on a chemical structure change, thereby to realize various physical properties. In particular, the compound constituting the brush form of the shell is very compatible with the epoxy resin. Thus, when the star polymer is mixed with the epoxy adhesive containing the epoxy resin, the wettability of the surface of the epoxy adhesive is increased and thus the adhesion ability is remarkably improved. That is, in the curing process, the star polymer is self-assembled in the epoxy resin, thereby improving the mechanical properties of the cured adhesive.

The structural epoxy adhesive composition containing the star polymer may satisfy both the high adhesion ability and impact-resistance required in the automotive or aviation industry and may be widely used in the fields.

DETAILED DESCRIPTIONS

Figure 1:
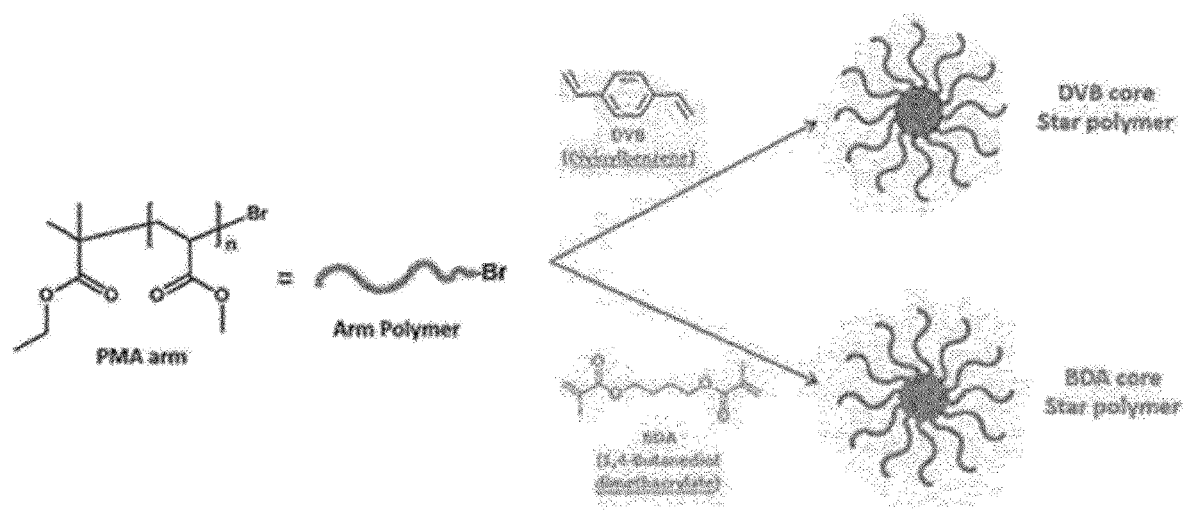
FIG. 1 is a diagram for describing a star polymer according to an embodiment of the present disclosure.

Hereinafter, embodiments of the present disclosure will be described in detail.

The present disclosure may be modified in various ways and may have various forms. Specific embodiments are illustrated in the drawings and described in detail herein. However, the specific embodiments are not intended to limit the present disclosure to any particular form. The present disclosure should be understood to contain all changes, equivalents, and substitutions that fall within the spirit and scope of the present disclosure. In describing the drawings, similar reference numerals are used for similar elements.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram for describing a star polymer according to an embodiment of the present disclosure.

Referring to FIG. 1, an additive for an epoxy adhesive according to the present disclosure contains a star polymer with a core/shell structure. As the shell in the core/shell structure is composed of a linear polymer, the additive for the epoxy adhesive has a star structure which may be referred to as a star polymer.

The star polymer may be formed via atomic transfer radical polymerization (ATRP) between the linear polymer of which one terminal is halogenated as an arm-polymer, and a diacrylate-based compound or a dimethacrylate-based compound. The linear polymer may constitute the shell while a polymer of the diacrylate-based compound or dimethacrylate-based compound may constitute the core. In this connection, the diacrylate-based compound or the dimethacrylate-based compound may act as a cross-linker.

When the diacrylate-based compound or dimethacrylate-based compound has the atomic transfer radical polymerization (ATRP) with the linear polymer of which one terminal is halogenated, an intermediate or prepolymer in which an oligomer of the diacrylate-based compound or dimethacrylate-based compound is inserted between the linear polymer and a halogen group is produced. Then, continuous polymerization and crosslinking reactions produce the star polymer.

Accordingly, a polymer polymerized using the diacrylate-based compound or dimethacrylate-based compound as a monomer constitutes the core. The linear polymer is disposed on a surface of the core. The core and linear polymer may be connected to each other through a carbon-carbon bond. In this connection, the polymer constituting the core is polymerized using the diacrylate-based compound or dimethacrylate-based compound as a monomer and, at the same time, includes a cross-linked structure thereof.

In one embodiment, the core may be a polymer using divinylbenzene (DVB) or 1,4-butanediol dimethacrylate (BDA) as a monomer. When the polymer of the divinylbenzene act as the core, the core has a rigid property. In contrast, when the polymer of the 1,4-butanediol dimethacrylate (BDA) acts as the core, the core has flexible properties.

In another embodiment, as a unit forming the core may include a compound in which a main chain includes polyethylene (PE), polyethylene oxide (PEO), polypropylene glycol (PPG), PTMEG, polydimethylsiloxane (PDMS), poly(styrene-co-butadiene-co-methyl methacrylate (MBS], styrene-butadiene-styrene triblock copolymer (SBS), or acrylonitrile-butadiene elastomer (NBR), and two acrylate groups or two methacrylate groups are bonded to both terminals of the main chain.

For stable dispersion of the star polymer in the epoxy adhesive composition, the diameter of the core may be in a range of 5 nm to 100 nm. When the diameter of the core is smaller than 5 nm, the star polymer may not serve as an additive affecting the mechanical properties of the epoxy resin. Further, when the diameter of the core exceeds 100 nm, there may be a problem that the adhesive strength is lowered by the additive.

The linear polymer that constitutes the shell includes poly acrylate. The poly acrylate means a polyalkyl acrylate compound, where a alkyl group may have 1 to 5 carbon atoms. The linear polymer constituting the shell may extend from the core outwardly of the star polymer. In this connection, the linear polymers may be combined onto the surface of the core and exposed to the outside in a form of a brush. The linear polymers may define a gap therebetween.

The linear polymer constituting the shell may be a polymethylacrylate compound represented by a following Chemical Formula 1:

[Chemical Formula 1]

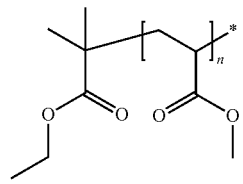

In the Chemical Formula 1, n represents an integer of 5 to 100. "*" represents a portion that chemically bonds with a carbon contained in the core.

In this connection, when n is an integer smaller than or equal to 4, an actual thickness of the prepared shell is smaller not to affect the dispersibility of the star polymer in the epoxy resin, compared to the nanoparticles without the shell. When n is an integer greater than 100, the length of the linear polymer is too long, and thus the thickness of the shell is substantially too thick. Thus, this may interfere with the additive effect of the linear polymer.

In the shell, an average molecular weight of the linear polymer has a molecular weight of 3000 to 20,000 g/mol. The average molecular weight of the linear polymer may be easily controlled using the amount of monomers used in the synthesis. The larger the average molecular weight of the linear polymer in the above range, the better the adhesion of the epoxy adhesive.

In one embodiment, when divinylbenzene is used to form the core, a molar ratio between the divinylbenzene and the linear polymer may be in a range of 6:1 to 10:1. When the molar ratio the divinylbenzene and the linear polymer is at least 6:1, a stable core/shell structure may be realized. When the molar ratio the divinylbenzene and the linear polymer is smaller than 6:1, the thickness of the shell is increased. When the molar ratio between the divinylbenzene and linear polymer exceeds 10:1, there is a problem that the core becomes too large and a complete shell may not be formed.

In one embodiment, when 1,4-butanediol dimethacrylate is used to form the core, the molar ratio between the 1,4-butanediol dimethacrylate and the linear polymer may be in a range of 12:1 to 18:1. In this connection, when the molar ratio between the 1,4-butanediol dimethacrylate and the linear polymer is at least 12:1, a stable core/shell structure may be realized. When the molar ratio between the 1,4-butanediol dimethacrylate and the linear polymer is smaller than 12: 1, the thickness of the shell is increased. When the molar ratio between the 1,4-butanediol dimethacrylate and linear polymer exceeds 12:1, the core becomes too large and a complete shell may not be formed.

Figure 2:
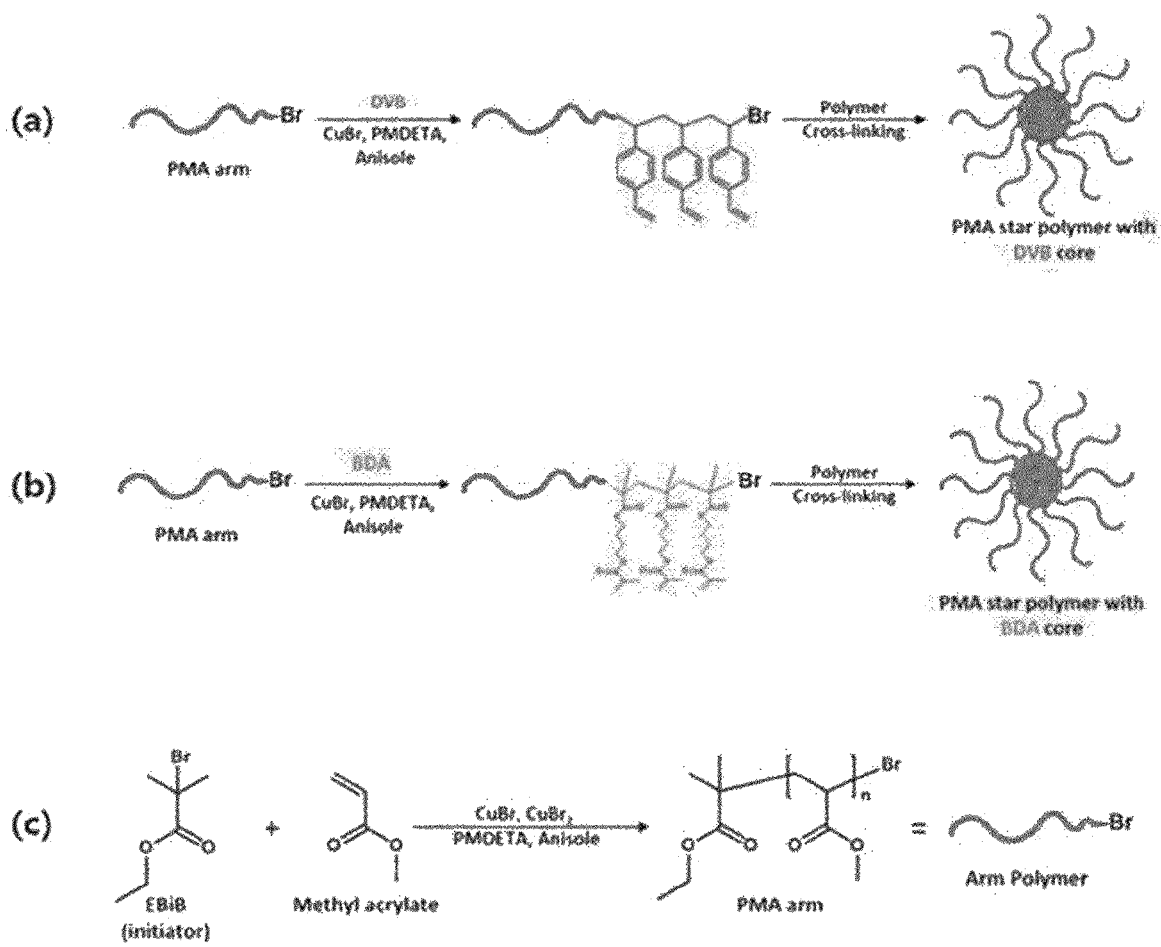
FIG. 2 is a diagram to describe a preparation method of the star polymer described in FIG. 1.

Hereinafter, a preparation method of the star polymer according to the present disclosure will be described with reference to FIG. 2 along with FIG. 1. FIG. 1 and FIG. 2 show use of divinylbenzene as a cross-linker and use of 1,4-butanediol dimethacrylate as a cross-linker respectively. However, as described above, various types of the diacrylate-based or dimethacrylate-based compounds may be used. The same descriptions as in FIG. 1 and FIG. 2 may be applied thereto.

FIG. 2 is a diagram to describe the preparation method of star polymer described in FIG. 1.

In FIG. 2, (a) is to describe a case of preparing the core using divinylbenzene. (b) is to describe a case of preparing the core using 1,4-butanediol dimethacrylate. (c) is to describe preparation of the arm-polymer.

Referring to FIG. 2 along with FIG. 1, the method first prepares the arm-polymer and then mixes and reacts the arm polymer with divinylbenzene or 1,4-butanediol dimethacrylate as a cross-linker, and a catalyst, a ligand compound and an organic solvent, thereby to prepare the star polymer according to the present disclosure.

Divinylbenzene or 1,4-butanediol dimethacrylate is polymerized under the catalyst, ligand compound, and organic solvent condition to form oligomers, which, in turn, are inserted between the linear polymer and halogen group in the arm-polymer. In this state, the polymerization and/or crosslinking reaction proceeds continuously, and, thus, finally the star polymer according to the present disclosure may be prepared.

In this connection, the catalyst may include copper halide. PMDETA (N,N,N',N''-pentamethyldiethylenetriamine) may be used as the ligand compound. Further, in this connection, the organic solvent may include anisole as a reaction solvent.

Referring to (c) of FIG. 2, the arm-polymer may be formed by reacting and polymerizing methyl acrylate as a monomer with an initiator. Copper halide and PMDETA are used in the preparation reaction of the arm-polymer. Anisole may be used as a reaction solvent. In this connection, ethyl α-bromoisobutyrate (EBiB) may be used as the initiator. As a result, the arm-polymer as the linear polymer having one end brominated is prepared.

As described above, when the star polymer having a core/shell structure according to the present disclosure is used as an additive for an epoxy adhesive, the star polymer is uniformly dispersed in a medium of a liquid epoxy resin. Although the cured product is formed using the epoxy resin, the star polymer may be uniformly dispersed in a polymer matrix of the cured product. In particular, the star polymer is uniformly dispersed while forming a micelle structure in the liquid epoxy resin. The uniform dispersion of the star polymer may improve the mechanical properties of the epoxy resin. This will be described below in more detail with respect to the structural epoxy adhesive composition.

The structural epoxy adhesive composition according to one embodiment of the present disclosure includes an epoxy resin, a star polymer and an epoxy curing agent. The star polymer is substantially the same as the star polymer described in FIG. 1 and FIG. 2. The structural epoxy adhesive composition may further contain rubber particles, a modified urethane resin and a modified epoxy resin.

The epoxy resin is a liquid epoxy resin that may include bisphenol-A derived epoxy resin. In addition, the epoxy resin may further include a chelate substituted functional epoxy resin and/or a reactive diluent together with the bisphenol-A derived epoxy resin. The functional epoxy resin may be liquid.

The star polymer may be mixed in an amount of 5 to 60 parts by weight based on 100 parts by weight of the epoxy resin. When the star polymer is added in an amount smaller than 5 parts by weight based on 100 parts by weight of the epoxy resin, the star polymer may have little effect on improving the mechanical properties of the epoxy resin. When the amount of the star polymer exceeds 60 parts by weight, the content of the star polymer is increased as much as the content of the epoxy resin, so that the adhesive strength may be lowered. Thus, the star polymer may be preferably mixed in an amount of 5 to 60 parts by weight based on 100 parts by weight of the epoxy resin.

The star polymer may be evenly dispersed in the medium of the epoxy resin to form micelles or vesicles. In the case where the core of the star polymer is a polymer of divinylbenzene, the core has a non-affinity with the epoxy resin such that the cores agglomerate, and the linear polymer having the affinity with the epoxy resin is directed to the epoxy resin. Thus, a reversed micelle structure may be formed or a vesicle may be formed. Further, when the core of the star polymer is a polymer of 1,4-butanediol dimethacrylate, both the core and the linear polymer have the affinity to the epoxy resin such that a direct micelle structure or a three-dimensional spherical micelle structure may be formed.

The epoxy curing agent may refer to a curing agent capable of thermally curing the epoxy resin at high temperatures. The epoxy curing agent may employ a curing agent capable of thermally curing the epoxy resin at a temperature of at least 100° C. or greater. For example, dicyan diamide may be used as the epoxy curing agent.

The rubber particles may be acrylic rubber particles. The size of each of the rubber particles may differ from the size of the star polymer. Each of the rubber particles may be larger than the diameter of the core of the star polymer. Since each of the rubber particles is larger than the star polymer, the overall adhesion strength and impact-resistance may be further improved.

The modified urethane resin is a component that is mixed with the epoxy resin to improve the adhesive strength and to soften the medium of the epoxy resin. As the modified urethane resin, liquid polyurethane having a phenol-functionalized terminal may be used.

The modified epoxy resin is itself a flexible epoxy resin, and is a component that aids a function of the modified urethane resin.

In addition, the structural epoxy adhesive composition according to the present disclosure may further contain other fillers, adhesion promoters and/or catalysts. Metal oxide particles may be used as the filler. The filler may function as an adhesion promoter. Further, an epoxy functionalized silane compound may be used as a separate adhesion promoter. Imidazole may be used as a catalyst.

Based on a total weight of the structural epoxy adhesive composition according to the present disclosure, a content of the epoxy resin may be in a range of 30 to 70 wt %, a content of the star polymer may be in a range of 1 to 45 wt %, a content of the rubber particles may be in a range of 2 to 15 wt %, the modified urethane resin may be in a range 10 to 50 wt %, a content of the modified epoxy resin may be in a range of 10 to 50% by weight, a content of the adhesion promoter may be in a range of 0.1 to 1% by weight, a content of the filler may be in a range of 1 to 10% by weight, and a content of the curing agent may be in a range of 1 to 10% by weight, and the catalyst may be in a range of 0.1 to 1% by weight.

The structural epoxy adhesive according to one embodiment may be formed by mixing the star polymer of the core/shell structure as described in FIG. 1 and FIG. 2, the epoxy resin, epoxy curing agent, catalyst, etc. with each other to prepare the composition and then by applying heat to the composition at 100° C. to 180° C. to cure the composition. In preparing the composition, a mixed solution of the star polymer mixed with an organic solvent (e.g., anisole) is mixed with a liquid epoxy resin. Thus, a heating process of 100° C. to 150° C. under a vacuum condition to remove the organic solvent may be performed in the state where the mixed solution is not mixed with the epoxy curing agent. Thus, the organic solvent is removed in this way. The additives such as the epoxy curing agent and catalyst are mixed with a mixture between the star polymer and the liquid epoxy resin. Then, the resulting mixture is thermally cured to obtain the adhesive. In this connection, while the star polymer is mixed with the liquid epoxy resin, the star polymer may be dispersed in the epoxy resin medium while forming the micelle structure as described above. That is, interposing the structural epoxy adhesive composition containing the star polymer, the epoxy resin and the epoxy curing agent between two substrates and applying heat thereto may allow the two substrates to be firmly bonded to each other without a separate member. In this connection, the two substrates may be formed of different materials or may be formed of the same material as each other. In particular, the substrates may be formed of a metal.

In the star polymer contained in the structural epoxy adhesive composition according to the present disclosure as described above, the compound constituting the brush form of the shell has excellent compatibility with the epoxy resin. Thu, when the star polymer is mixed with the epoxy adhesive containing the epoxy resin, the wettability of the surface of the epoxy adhesive may be increased such that the adhesion ability thereof is remarkably improved. That is, in the curing process of the adhesive, the star polymer may be self-assembled into the direct micelle or reverse micelle structure in the epoxy resin, thereby improving the mechanical properties of the cured adhesive.

The star polymer in accordance with the present disclosure may replace the core/shell structured rubber (CSR) particles. The linear polymer constituting the shell thereof has excellent compatibility with the epoxy resin to easily disperse the particles. The structural epoxy adhesive composition containing the star polymer may satisfy both the high adhesion ability and impact-resistance required in the automotive or aviation industry and may be widely used in the fields.

Hereinafter, the present disclosure will be described in more detail based on specific preparation examples and property evaluation results of samples as prepared accordingly.

PREPARATION EXAMPLE: PREPARATION OF LINEAR POLYMER

As shown in (c) of FIG. 2, the linear polymer was synthesized using ATRP. Specifically, the ATRP reaction condition was based on a conversion 50% and then the ATRP was carried out in a 70° C. thermostat having an argon (Ar) atmosphere. First, 100 g of methyl acrylate monomer purified using an alumina column in a flask and 3.77 g of EBiB as an initiator were mixed with each other. Then, catalyst (1.38 g CuBr, 0.21 g $CuBr_2$), ligand compound (PMDETA 3.35 g), and organic solvent (anisole 20 g) were added thereto and then argon was injected thereto for 10 to 15 minutes. Thereafter, the reaction was carried out for 3 hours in the reactor maintained at 70° C. After the reaction was completed, the mixture was diluted with tetrahydrofuran (THF). The catalyst was removed using an alumina column therefrom. The solvent was then removed therefrom using an evaporator. Precipitates was caught using methanol to obtain a yellow transparent liquid having a sticky viscosity. In this connection, a molecular weight of the linear polymer as obtained was 3,000 g/mol (hereinafter referred to as 3K).

Then, substantially the same process except for the reaction time in the reactor was carried out to obtain a linear polymer having a molecular weight of 5,000 g/mol (5K). Further, linear polymers with molecular weights of 10,000 g/mol (10K) and 15,000 g/mol (15K) were obtained, respectively.

Preparation of Sample 1-1

A star polymer (sample 1-1) according to an embodiment of the present disclosure was prepared using the 3K linear polymer as prepared above and divinylbenzene (DVB).

Specifically, 30 g of the 3K linear polymer, divinylbenzene, and catalyst (CuBr) were mixed with each other in a molar ratio of 1:8:0.8 and were synthesized. The 3K linear polymer, divinylbenzene, catalyst (CuBr), ligand compound (PMDETA) and organic solvent (anisole) were added into a flask, and then argon was injected thereto for 10 to 15 minutes. Then, the mixture has reacted for 48 hours in a thermostat at 100° C. After the reaction, the mixture was diluted with THF. The catalyst was removed therefrom through an alumina column. The solvent was then removed therefrom using an evaporator. Precipitates was caught using methanol to obtain DVB core particles. Unreacted 3K linear polymer was removed using fractional precipitation. The result was identified using GPC.

Preparation of Sample 1-2 to Sample 1-4

Substantially the same process as the preparation of sample 1-1 except for using the 5K linear polymer (27 g) was carried out to obtain a sample 1-2.

Further, samples 1-3 and sample 1-4 were obtained by carrying out substantially the same process as the preparation of sample 1-1 except that the 10K linear polymer (34 g) and 15K linear polymer (24 g) were used.

Preparation of Sample 2-1 to Sample 2-4

Substantially the same process as the preparation of sample 1-1 except that 25 g of the 3K linear polymer, 16 g of 1,4-butanediol dimethacrylate, 0.57 g of catalyst (CuBr) and 0.69 g of PMDETA, and 100 g of anisole as the reaction solvent were used was carried out to obtain a sample 2-1.

Sample 2-2 sample 2-3 and sample 2-4 were obtained by carrying out substantially the same processes as the preparation of sample 2-1, except that the 5K linear polymer (23 g), the 10K linear polymer (20 g) and the 15K linear polymer (22 g) were used respectively.

GPC Analysis Results

Figure 3:
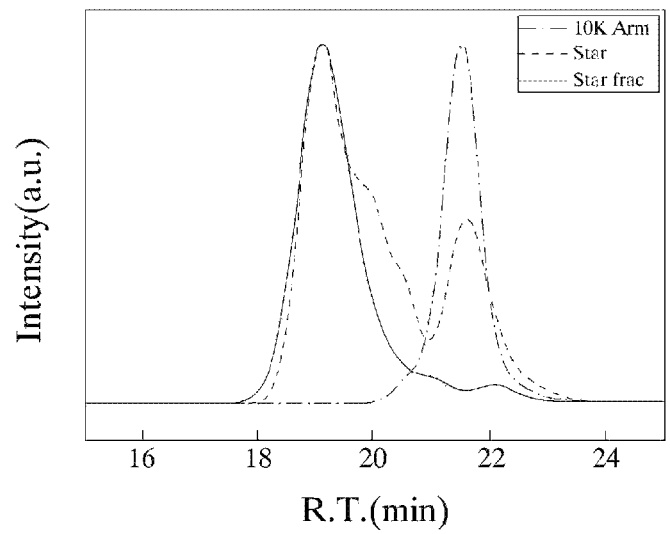
FIG. 3 to FIG. 5 show results of GPC (gel permeation chromatography) analysis of samples according to an embodiment of the present disclosure.
Figure 4:
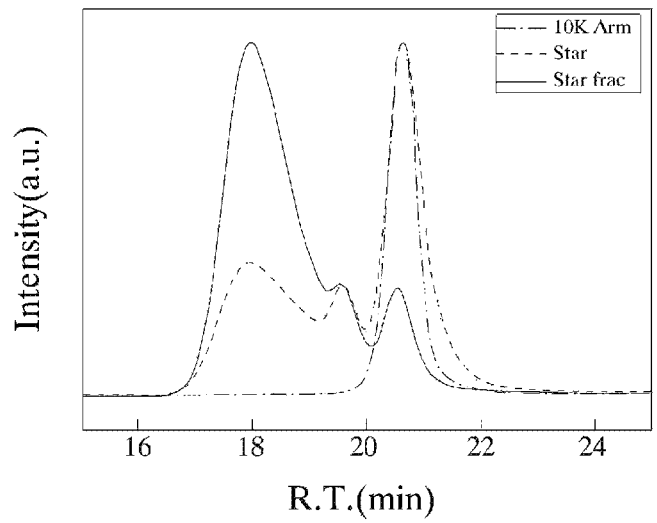
Figure 5:
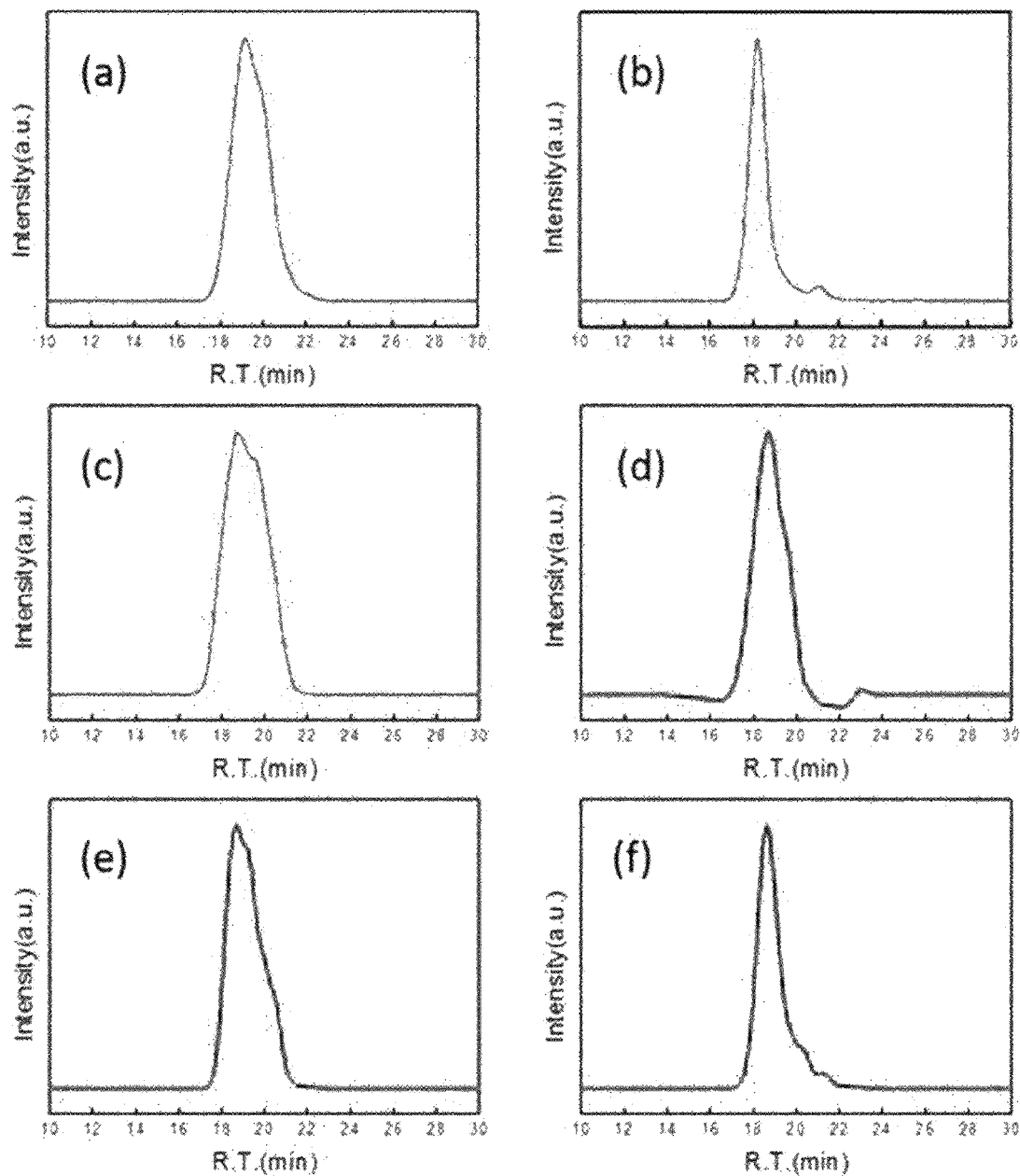

The results of gel permeation chromatography (GPC) analysis for the samples 1-1 to 1-4 and the samples 2-1 to 2-4 as prepared are shown in FIG. 3 to FIG. 5.

FIG. 3 to FIG. 5 show the results of GPC analysis of samples according to an embodiment of the present disclosure.

FIG. 3 is directed to the sample 1-2. FIG. 4 is directed to the sample 2-2. (a) to (c) in FIG. 5 relate to the sample 1-1, sample 1-3, and sample 1-4 respectively. (d) to (e) in FIG. 5 relate to the sample 2-1, sample 2-3 and sample 2-4 respectively.

In FIG. 3 and FIG. 4, respectively, "10K arm" refers to a GPC graph of the 10K linear polymer. "star" refers to a GPC graph of the product immediately after the synthesis. "star_frac" refers to a GPC graph of the product after removing the unreacted 10K linear polymer.

Referring to FIG. 3 and FIG. 4, it may be seen that the star polymer of the core/shell structure described in FIG. 1 and FIG. 2 was prepared from the ATRP reaction. It may be identified that, immediately after the reaction, the unreacted linear polymer is present, whereas after removing the same, a solution in which the star polymer is dispersed in the anisole is prepared.

Referring to FIG. 5, it may be seen that the star polymer of the core/shell structure may be prepared through the ATRP reaction using the linear polymer having molecular weights of 5K, 15K, and 20K.

Evaluation of Dispersibility in Epoxy Resin 15 g of Sample 1-1 as prepared above was mixed with 85 g of a liquid epoxy resin, and the mixture was stirred while heating the same at 100° C. The agitation was performed for about 1 hour. During the stirring, a vacuum was applied thereto to sufficiently remove the solvent.

Further, the same process was applied to 15 g of the sample 2-1.

In this connection, a bisphenol-A derived epoxy resin YD-128 (trade name, Kukdo Chemical, Korea) was used. A final state of each product was identified by TEM (transmission electron microscope) and photographed to obtain a photograph. The results are shown in FIG. 6 and FIG. 7.

Figure 6:
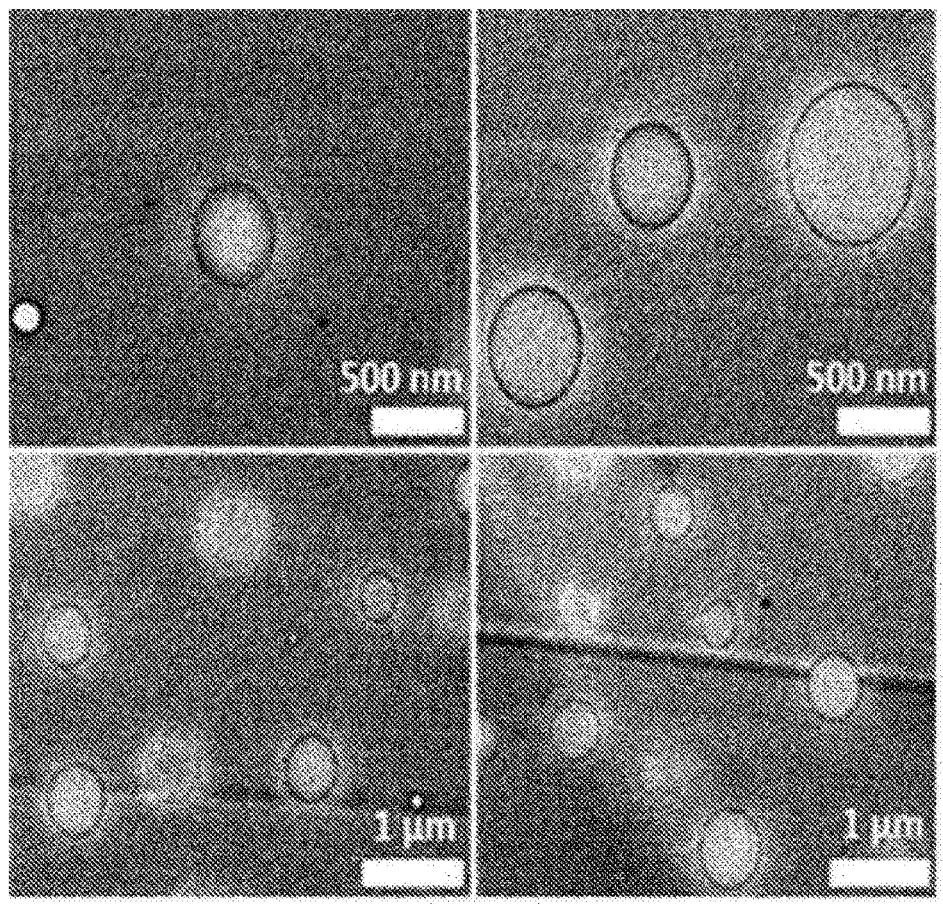
FIG. 6 and FIG. 7 show TEM (transmission electron microscope) images showing a state of the star polymer in a liquid epoxy resin.
Figure 7:
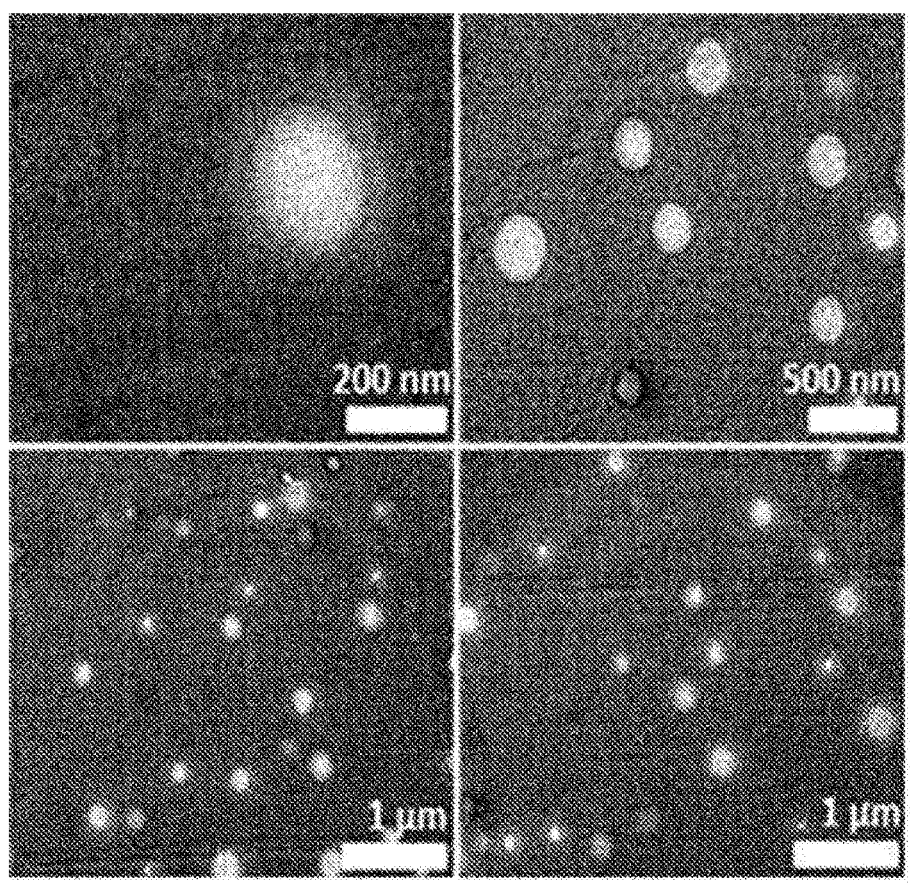

FIG. 6 and FIG. 7 show TEM (TEM) images showing the states of the star polymers in the liquid epoxy resin.

FIG. 6 is directed to a TEM photograph of the sample 1-1. FIG. 7 is directed to a TEM image using the sample 2-1. Referring to FIG. 6, in the use of divinylbenzene with the non-affinity with the epoxy resin, the reversed micelles were formed in the epoxy resin. This may be shown as a vesicle structure in the TEM image. It may be seen that these vesicle structures are dispersed without aggregation in the epoxy resin.

Referring to FIG. 7, when the sample 2-1 containing the star polymer having a polymer of 1,4-butanediol dimethacrylate as the core having an affinity with the epoxy resin was mixed with the epoxy resin, it may be seen that the star polymer forms a direct micelle and has a spherical micelle structure and is dispersed without aggregation in the epoxy resin.

Further, the core/shell star polymer nanoparticles synthesized in accordance with the present disclosure had a core size of 10 nm to 15 nm, which is smaller than 100 to 250 nm, which is the size of each of the existing CSR particles. Since the smaller the particle size, the better the mechanical properties, the nanoparticle size achieved in accordance with the present disclosure is a desirable size in terms of excellent physical properties. In general, as the particle size decreases to about 10 nm, dispersion becomes greater difficult. However, the nanoparticles synthesized in accordance with the present disclosure have the advantage of the high dispersibility due to the excellent compatibility of the arm polymer with the epoxy resin regardless of the size thereof.

Preparation of Samples for Adhesion Ability Evaluation

Each of the samples 1-1 to 1-4 and samples 2-1 to 2-4 as prepared was mixed with bisphenol-A derived epoxy resin YD-128 (trade name, Kukdo Chemical, Korea) at a weight ratio of 15:85. Then, 7 phr curing agent DICY and 1 phr imidazole catalyst were added thereto to prepare samples for adhesion evaluation. Each of these samples was applied to a specimen for measuring a lap shear strength of a steel sheet and was thermally cured for 20 minutes at 180° C. After the thermal curing, the lap shear strength was measured using a tensile tester. The results are shown in Table 1 below.

TABLE 1

| Cores | Molecular Weight of Linear Polymer | Star polymer sample | Lap shear (MPa) |
|---|---|---|---|
| DVB | 3 K | Sample 1-1 | 31.0 |
|  | 5 K | Sample 1-2 | 29.6 |
|  | 10 K | Sample 1-3 | 28.2 |
|  | 15 K | Sample 1-4 | 26.9 |
| BDA | 3 K | Sample 2-1 | 30.3 |
|  | 5 K | Sample 2-2 | 28.9 |
|  | 10 K | Sample 2-3 | 27.0 |
|  | 15 K | Sample 2-4 | 25.7 |
| Comparative sample (including only epoxy) |  |  | 23.0 |

Referring to Table 1, when only the epoxy resin was contained, the result was 23.0 MPa. When the products contained the star polymer according to the embodiments of the present disclosure, it may be seen that all of the lap shear strengths thereof were at least 25.7 MPa, and were high values. When using the sample 1-1 or sample 2-1, it may be seen that each of the lap shear values exceed 30 MPa. In particular, according to the results of Table 1, it may be seen that the case where the molecular weight of the linear polymer is 3K relatively exhibited the high lap shear strength than those in the other cases. That is, the smaller the molecular weight of the linear polymer, the higher the lap shear strength property.

Preparation of Adhesive Sample (Products 1 to 8)

Adhesive samples (product 1 to 8) were respectively prepared using the samples 1-1 to 1-4 and sample 2-1 to 2-4 prepared as described above based on components and formulation according to a following Table 2.

Each adhesive composition was prepared by mixing an epoxy resin, rubber particles, modified urethane resin, modified epoxy resin, adhesion promoter, filler, curing agent and catalyst with each other. In this connection, the epoxy resin included bisphenol-A derived epoxy resin YD-128 (trade name, Kukdo Chemical, Korea), chelate-substituted liquid epoxy resin EP49-10N (trade name, ADEKA, Japan), and reactive diluent PG-207 (trade name, Kukdo Chemical) , Korea). F351 (trade name, Zeon) was used as the rubber particles, DY-965 (trade name, Huntsman) was used as the modified urethane resin, XP3511 (trade name, STRUKTOL) was used as the modified epoxy resin, and A-187, an epoxy functionalized silane was used as the adhesion promoter. CaO and $SiO_2$ were used as the fillers and DICY (dicyan diamide) was used as the curing agent. A content unit of each component in the following Table 2 is "% by weight".

TABLE 2

| Components | | Products | | | | | | | |
|---|---|---|---|---|---|---|---|---|---|
| Type | Material | 1 | 2 | 3 | 4 | 5 | 6 | 7 | 8 |
| Epoxy resin | YD-128 | 18 | 18 | 18 | 18 | 18 | 18 | 18 | 18 |
| | EP49-10N | 7 | 7 | 7 | 7 | 7 | 7 | 7 | 7 |
| | Reaction diluent PG-207 | 7 | 7 | 7 | 7 | 7 | 7 | 7 | 7 |
| Rubber particles | F351 | 12 | 12 | 12 | 12 | 12 | 12 | 12 | 12 |
| Modified urethane | DY-965 | 15 | 15 | 15 | 15 | 15 | 15 | 15 | 15 |
| Modified epoxy | 3511 | 15 | 15 | 15 | 15 | 15 | 15 | 15 | 15 |
| Star polymer | Sample 1-1 | 15 | | | | | | | |
| | Sample 1-2 | | 15 | | | | | | |
| | Sample 1-3 | | | 15 | | | | | |
| | Sample 1-4 | | | | 15 | | | | |
| | Sample 2-1 | | | | | 15 | | | |
| | Sample 2-2 | | | | | | 15 | | |
| | Sample 2-3 | | | | | | | 15 | |
| | Sample 2-4 | | | | | | | | 15 |
| Adhesion Promoter | A-187 | 0.5 | 0.5 | 0.5 | 0.5 | 0.5 | 0.5 | 0.5 | 0.5 |
| Filler | CaO | 3 | 3 | 3 | 3 | 3 | 3 | 3 | 3 |
| | $SiO_2$ | 2 | 2 | 2 | 2 | 2 | 2 | 2 | 2 |
| Curing agent | DICY | 5 | 5 | 5 | 5 | 5 | 5 | 5 | 5 |
| Catalyst | Imidazole | 0.5 | 0.5 | 0.5 | 0.5 | 0.5 | 0.5 | 0.5 | 0.5 |

Property Evaluation of Products

Each of the products prepared as described above was applied to a specimen for measuring the lap shear strength of the steel sheet and was heat cured at 180° C. for 20 minutes. After the heat curing, the lap shear strength, the T-peel strength and the Impact-peel strength were measured, respectively. The results are shown in Table 3 below.

TABLE 3

| | Products | | | | | | | |
|---|---|---|---|---|---|---|---|---|
| Properties | 1 | 2 | 3 | 4 | 5 | 6 | 7 | 8 |
| Lap shear strength (MPa) | 37 | 35.6 | 34.2 | 34.5 | 35.5 | 34.8 | 34.2 | 35.1 |
| T-peel strength (N/25 mm) | 250 | 281 | 285 | 284 | 303 | 314 | 308 | 305 |
| Impact-peel strength (N/mm) 23° C. | 21 | 26 | 31 | 29 | 34 | 39 | 44 | 41 |

Referring to Table 3, the high lap shear strength was identified at all composition contents (in all of the products 1 to 8) using the star polymer according to the present disclosure. The T-peel strength was varied therebetween where the T-peel strengths of the products 5 to 8 using the samples 2-1 to 2-4 showed a high value. Further, the impact-peel strength is high for the products 5 to 8 using the samples 2-1 to 2-5. The higher the molecular weight of linear polymer, in other words, the longer the linear polymer, a higher value the impact-peel strength.

Although the present disclosure has been described above with reference to the preferred embodiments of the present disclosure, those skilled in the art will appreciate that various modifications and changes may be made in the present disclosure without departing from the spirit and scope of the present disclosure set forth in the following claims.

What is claimed is:

1. An additive for an epoxy adhesive, the additive comprising a star-shaped star polymer having a core/shell structure, wherein the star polymer is formed via atomic transfer radical polymerization (ATRP) between an arm-polymer and a cross-linker, wherein the arm-polymer includes a polyacrylate having one halogenated terminal, wherein the core includes a polymer resulting from polymerization of the cross-linker, and a portion of the arm-polymer constitutes the shell,
wherein the cross-linker includes 1,4-butanediol dimethacrylate, wherein a molar ratio of 1,4-butanediol dimethacrylate used for formation of the core and the arm-polymer is in a range of 12:1 to 18:1.

2. The additive for the epoxy adhesive of claim 1, wherein the core has a diameter of 5 nm to 100 nm.

3. A structural epoxy adhesive composition comprising:
an epoxy resin;
an additive for the epoxy adhesive; and
an epoxy curing agent,
wherein the additive comprises a star-shaped star polymer having a core/shell structure, wherein the star polymer is formed via atomic transfer radical polymerization (ATRP) between an arm-polymer and a cross-linker, wherein the arm-polymer includes a polyacrylate having one halogenated terminal, and the cross-linker includes a divinyl benzene-based compound, a diacrylate-based compound, or a dimethacrylate-based compound, wherein the core includes a polymer resulting from polymerization of the cross-linker, and a portion of the arm-polymer constitutes the shell.

4. The structural epoxy adhesive composition of claim 3, wherein a content of the additive for the epoxy adhesive is in a range of 5 to 60 parts by weight based on 100 parts by weight of the epoxy resin.

5. The structural epoxy adhesive composition of claim 3, wherein the structural epoxy adhesive composition further contains rubber particles, modified urethane resin and modified epoxy resin.

6. The structural epoxy adhesive composition of claim 5, wherein the epoxy resin includes a bisphenol-A derived epoxy resin, a chelate-substituted functional epoxy resin, and a reactive diluent.

7. The structural epoxy adhesive composition of claim 3, wherein the additive for the epoxy adhesive is dispersed in the epoxy resin as a medium while forming a micelle or vesicle.

8. The structural epoxy adhesive composition of claim 3, wherein the structural epoxy adhesive composition is cured at 100° C. to 180° C. to form a cured product thereof, wherein the additive for the epoxy adhesive is dispersed in a form of a micelle or vesicle in the cured product.

* * * * *